United States Patent
Goldsmith et al.

(10) Patent No.: US 9,465,536 B2
(45) Date of Patent: Oct. 11, 2016

(54) INPUT METHODS FOR DEVICE HAVING MULTI-LANGUAGE ENVIRONMENT

(71) Applicant: Apple Inc., Cupertino, CA (US)

(72) Inventors: Deborah Eileen Goldsmith, Los Gato, CA (US); Takumi Takano, Tokyo (JP); Toshiyuki Masui, Palo Alto, CA (US); Leland Douglas Collins, Jr., Palo Alto, CA (US); Yasuo Kida, Palo Alto, CA (US); Kenneth L. Kocienda, San Jose, CA (US)

(73) Assignee: Apple Inc., Cupertino, CA (US)

( * ) Notice: Subject to any disclaimer, the term of this patent is extended or adjusted under 35 U.S.C. 154(b) by 404 days.

(21) Appl. No.: 14/187,176

(22) Filed: Feb. 21, 2014

(65) Prior Publication Data

US 2014/0173494 A1 Jun. 19, 2014

Related U.S. Application Data

(63) Continuation of application No. 12/307,429, filed on Sep. 9, 2008, now Pat. No. 8,661,340.

(60) Provisional application No. 60/972,185, filed on Sep. 13, 2007.

(51) Int. Cl.
*G06F 3/00* (2006.01)
*G06F 3/0488* (2013.01)
*G06F 3/023* (2006.01)

(52) U.S. Cl.
CPC ......... *G06F 3/04886* (2013.01); *G06F 3/0237* (2013.01); *G06F 3/0488* (2013.01); *H04M 2250/58* (2013.01)

(58) Field of Classification Search
CPC . G06F 3/04886; G06F 3/0237; G06F 3/0488
See application file for complete search history.

(56) References Cited

U.S. PATENT DOCUMENTS

| 5,379,057 A | 1/1995 | Clough et al. |
| 5,535,119 A | 7/1996 | Ito et al. |

(Continued)

FOREIGN PATENT DOCUMENTS

| CN | 1834872 A | 9/2006 |
| CN | 1949158 A | 4/2007 |

(Continued)

OTHER PUBLICATIONS

Office Action received for Chinese Patent Application No. 201210377992.0, mailed on Sep. 3, 2014, 9 pages (3 pages of English Translation and 6 pages of Official Copy).

(Continued)

*Primary Examiner* — Stephen Hong
*Assistant Examiner* — Marshon Robinson
(74) *Attorney, Agent, or Firm* — Morrison & Foerster LLP (57) ABSTRACT

Text input is corrected on a touch-sensitive display by presenting a list of candidate words in the interface which can be selected by touch input. The candidate list can include candidate words having two or more character types (e.g., Roman, kana, kanji). In one aspect, the candidate list can be scrolled using a finger gesture. When a user's finger traverses a candidate word and the touch is released, the candidate word is inserted into a document being edited. In another aspect, characters can be erased by touching a key (e.g., a backspace or delete key) and making a sliding, swiping, or other finger gesture. A number of characters proportional to a distance (e.g., a linear distance) of the finger gesture across the display are erased. If there are characters in a text input area, those characters are erased first, followed by characters in the document being edited.

9 Claims, 5 Drawing Sheets

(56) References Cited

U.S. PATENT DOCUMENTS

| | | | |
|---|---|---|---|
| 5,675,362 | A | 10/1997 | Clough et al. |
| 5,959,629 | A | 9/1999 | Masui |
| 6,115,053 | A | 9/2000 | Perlin |
| 6,278,968 | B1 | 8/2001 | Franz et al. |
| 6,323,846 | B1 | 11/2001 | Westerman et al. |
| 6,570,557 | B1 | 5/2003 | Westerman et al. |
| 6,661,409 | B2 | 12/2003 | Demartines et al. |
| 6,677,932 | B1 | 1/2004 | Westerman |
| 6,766,179 | B1 | 7/2004 | Shiau et al. |
| 6,888,536 | B2 | 5/2005 | Westerman et al. |
| 7,030,863 | B2 | 4/2006 | Longe et al. |
| 7,096,432 | B2 | 8/2006 | Huapaya et al. |
| 7,147,562 | B2 | 12/2006 | Ohara et al. |
| 7,619,677 | B2 | 11/2009 | Matsuda et al. |
| 7,844,914 | B2 | 11/2010 | Andre et al. |
| 2002/0015024 | A1 | 2/2002 | Westerman et al. |
| 2002/0167545 | A1 | 11/2002 | Kang et al. |
| 2002/0168107 | A1 | 11/2002 | Tang et al. |
| 2003/0024375 | A1 | 2/2003 | Sitrick |
| 2003/0100965 | A1 | 5/2003 | Sitrick et al. |
| 2003/0160817 | A1 | 8/2003 | Ishida et al. |
| 2003/0216913 | A1 | 11/2003 | Keely et al. |
| 2004/0140956 | A1 | 7/2004 | Kushler et al. |
| 2004/0230912 | A1 | 11/2004 | Clow et al. |
| 2005/0024341 | A1 | 2/2005 | Gillespie et al. |
| 2005/0099408 | A1 | 5/2005 | Seto et al. |
| 2005/0152600 | A1 | 7/2005 | Chen et al. |
| 2005/0174333 | A1 | 8/2005 | Robinson et al. |
| 2006/0053387 | A1 | 3/2006 | Ording |
| 2006/0085757 | A1 | 4/2006 | Andre et al. |
| 2006/0117067 | A1 | 6/2006 | Wright et al. |
| 2006/0144211 | A1 | 7/2006 | Yoshimoto |
| 2006/0274051 | A1 | 12/2006 | Longe et al. |
| 2007/0024736 | A1 | 2/2007 | Matsuda et al. |
| 2007/0120822 | A1 | 5/2007 | Iso |
| 2007/0198950 | A1 | 8/2007 | Dodge et al. |
| 2008/0030481 | A1 | 2/2008 | Gunn et al. |
| 2008/0072156 | A1 | 3/2008 | Sitrick |
| 2008/0094356 | A1 | 4/2008 | Ording et al. |
| 2009/0037837 | A1 | 2/2009 | Raghunath et al. |
| 2009/0051661 | A1 | 2/2009 | Kraft et al. |
| 2009/0058823 | A1 | 3/2009 | Kocienda |
| 2009/0193361 | A1 | 7/2009 | Lee et al. |
| 2009/0225041 | A1 | 9/2009 | Kida et al. |
| 2009/0226091 | A1 | 9/2009 | Goldsmith et al. |
| 2009/0265669 | A1 | 10/2009 | Kida et al. |

FOREIGN PATENT DOCUMENTS

| | | |
|---|---|---|
| EP | 1698982 A2 | 9/2006 |
| JP | 8-272787 A | 10/1996 |
| JP | 10-49272 A | 2/1998 |
| JP | 11-305933 A | 11/1999 |
| JP | 2000-112636 A | 4/2000 |
| JP | 2002-108543 A | 4/2002 |
| JP | 3314276 B2 | 8/2002 |
| JP | 2002-325965 A | 11/2002 |
| JP | 2004-280531 A | 10/2004 |
| JP | 2005-092256 A | 4/2005 |
| JP | 2005-092441 A | 4/2005 |
| KR | 10-2004-0016365 A | 2/2004 |
| WO | 00/74240 A1 | 12/2000 |
| WO | 2005/064587 A2 | 7/2005 |
| WO | 2007/037809 A1 | 4/2007 |
| WO | 2007/047188 A2 | 4/2007 |
| WO | 2007/070223 A1 | 6/2007 |
| WO | 2009/000038 A1 | 12/2008 |
| WO | 2009/032483 A1 | 3/2009 |
| WO | 2009/111138 A1 | 9/2009 |

OTHER PUBLICATIONS

International Preliminary Report on Patentability received for PCT Patent Application No. PCT/US2009/033696, mailed on Sep. 16, 2010, 7 pages.

International Search Report and Written Opinion received for PCT Patent Application No. PCT/US2009/033696, mailed on Apr. 29, 2009, 8 pages.

International Preliminary Report on Patentability received for PCT Patent Application No. PCT/US2009/072803, mailed on Mar. 18, 2010, 11 pages.

International Search Report and Written Opinion received for PCT Patent Application No. PCT/US2009/072803, mailed on Feb. 18, 2009, 19 pages.

Invitation to Pay Fees and Partial International Search Report received for PCT Patent Application No. PCT/ US2009/072803, mailed on Nov. 11, 2008, 7 pages.

Decision to Grant received for Chinese Patent Application No. 200810149120.2, mailed on Jul. 23, 2013, 10 pages.

Office Action Received for Chinese Patent Application No. 200910118235.X, mailed on Jul. 29, 2010, 9 pages.

Office Action received for Japanese Patent Application No. 2008-265763, mailed on Jun. 18, 2012, 1 page.

Notice of Allowance received for Korean Patent Application No. 10-2008-90303, mailed on Aug. 9, 2012, 2 pages.

Notice of Allowance received for Korean Patent Application No. 10-2011-80119, mailed on Aug. 14, 2012, 2 pages.

Notice of Allowance received for Korean Patent Application No. 10-2011-80121, mailed on Mar. 18, 2013, 4 pages.

Office Action received for Korean Patent Application No. 10-2011-80121, mailed on Aug. 9, 2012, 4 pages.

Final Office Action received for U.S. Appl. No. 12/207,429, mailed on Nov. 28, 2011, 11 pages.

Final Office Action received for U.S. Appl. No. 12/207,429, mailed on Oct. 25, 2012, 8 pages.

Non-Final Office Action received for U.S. Appl. No. 12/207,429, mailed on Jun. 21, 2013, 8 pages.

Non-Final Office Action received for U.S. Appl. No. 12/207,429, mailed on Jun. 9, 2011, 10 pages.

Non-Final Office Action received for U.S. Appl. No. 12/207,429, mailed on Mar. 30, 2012, 9 pages.

Notice of Allowance received for U.S. Appl. No. 12/207,429, mailed on Oct. 8, 2013, 9 pages.

Chou, Chia-Chi, U.S. Appl. No. 12/476,121, filed Jun. 1, 2009, titled "Zhuyin Input Interface on a Device", 82 pages.

Goldsmith et al., U.S. Appl. No. 12/167,044, filed Jul. 2, 2008, titled "Identification of Candidate Characters for Text Input", 41 pages.

Kida et al., U.S. Appl. No. 12/107,711, filed Apr. 22, 2008, titled "Language Input Interface on a Device", 47 pages.

Liu et al., "Online Recognition of Chinese Characters: The State-of-the-Art", IEEE Transactions on Pattern Analysis and Machine Intelligence, vol. 26, No. 2, Feb. 2004, pp. 198-213.

Masui, T., "An Efficient Text Input Method for Pen-based Computers", Proceedings of the ACM Conference on Human Factors in Computing System (CHI '98), ACM press, Apr. 1998, pp. 328-335.

Masui, T., "POBox: An Efficient Text Input Method for Handheld and Ubiquitous Computers", Proceedings of the Internation Symposium on Handheld and Ubiquitous Computer (HUC '99), Sep. 1999, 12 pages.

Sacher, H., "Interactions in Chinese: Designing Interfaces for Asian Languages", Interactions Magazine, vol. 5, Issue 5, Sep.-Oct. 1998, pp. 28-38.

Decision to Grant received for Chinese Patent Application No. 201210377992.0, mailed on May 06, 2015, 4 pp. (Official Copy only). (See Communication under 37 CFR § 1.98(a) (3)).

INPUT METHODS FOR DEVICE HAVING MULTI-LANGUAGE ENVIRONMENT

RELATED APPLICATIONS

This application is a continuation of U.S. application Ser. No. 12/207,429, filed Sep. 9, 2008, which claims priority to U.S. Provisional Patent Application Ser. No. 60/972,185 filed Sep. 13, 2007, and entitled "Input Methods for Device Having Multi-Language Environment," both of which are incorporated herein by reference in their entirety.

TECHNICAL FIELD

The subject matter of this application is generally related to input editing interfaces.

BACKGROUND

A computer device can be configured to receive input of text and characters from a computer keyboard. Modern computer keyboards are composed of rectangular or near-rectangular keys, and characters, such as the letters A-Z in the English alphabet, are usually engraved or printed on the keys. In most cases, each press of a key corresponds to typing of a single character.

Traditional computer keyboards may sometimes be too large for portable devices, such as cellular phones, MPEG-1 Audio Layer 3 (MP3) players, or personal digital assistants (PDAs). Some portable devices include a smaller version of the traditional computer keyboard or use a virtual keyboard to receive user input. A virtual keyboard can be of the form of a software application or a feature of a software application to simulate a computer keyboard. For example, in a stylus-operated PDA or a touch-sensitive display on a communication device, a virtual keyboard can be used by a user to input text by selecting or tabbing keys of the virtual keyboard These smaller keyboards and virtual keyboards may have keys that correspond to more than one character. For example, some of the keys can, by default, correspond to a common character in the English language, for example, the letter "a," and may also correspond to other additional characters, such as another letter or the letter with an accent option, e.g., the character "a," or other characters with accent options. Because of the physical limitations (e.g., size) of the virtual keyboard, a user may find it difficult to type characters not readily available on the virtual keyboard.

Input methods for devices having multi-language environments can present unique challenges with respect to input and spelling correction which may need to be tailored to the selected language to ensure accuracy and an efficient workflow.

SUMMARY

Text input is corrected on a touch-sensitive display by presenting a list of candidate words in the interface which can be selected by touch input. The candidate list can include candidate words having two or more character types (e.g., Roman, kana, kanji). In one aspect, the candidate list can be scrolled using a finger gesture. When a user's finger traverses a candidate word, the position of the candidate word is adjusted (e.g., offset from the touch input), so that the candidate word is not obscured by the user's finger. When the touch is released, the candidate word is inserted into a document being edited. In another aspect, characters can be erased by touching a key (e.g., a backspace or delete key) and making a sliding, swiping, or other finger gesture. A number of characters proportional to a distance (e.g., a linear distance) of the finger gesture across the display are erased. If there are characters in a text input area, those characters are erased first, followed by characters in the document being edited. In another aspect, in a Japanese language environment, auto-correcting is performed to account for possible typographical errors on input.

Other implementations are disclosed, including implementations directed to systems, methods, apparatuses, computer-readable mediums, and user interfaces.

DETAILED DESCRIPTION

Input Editing User Interface

Figure 1:
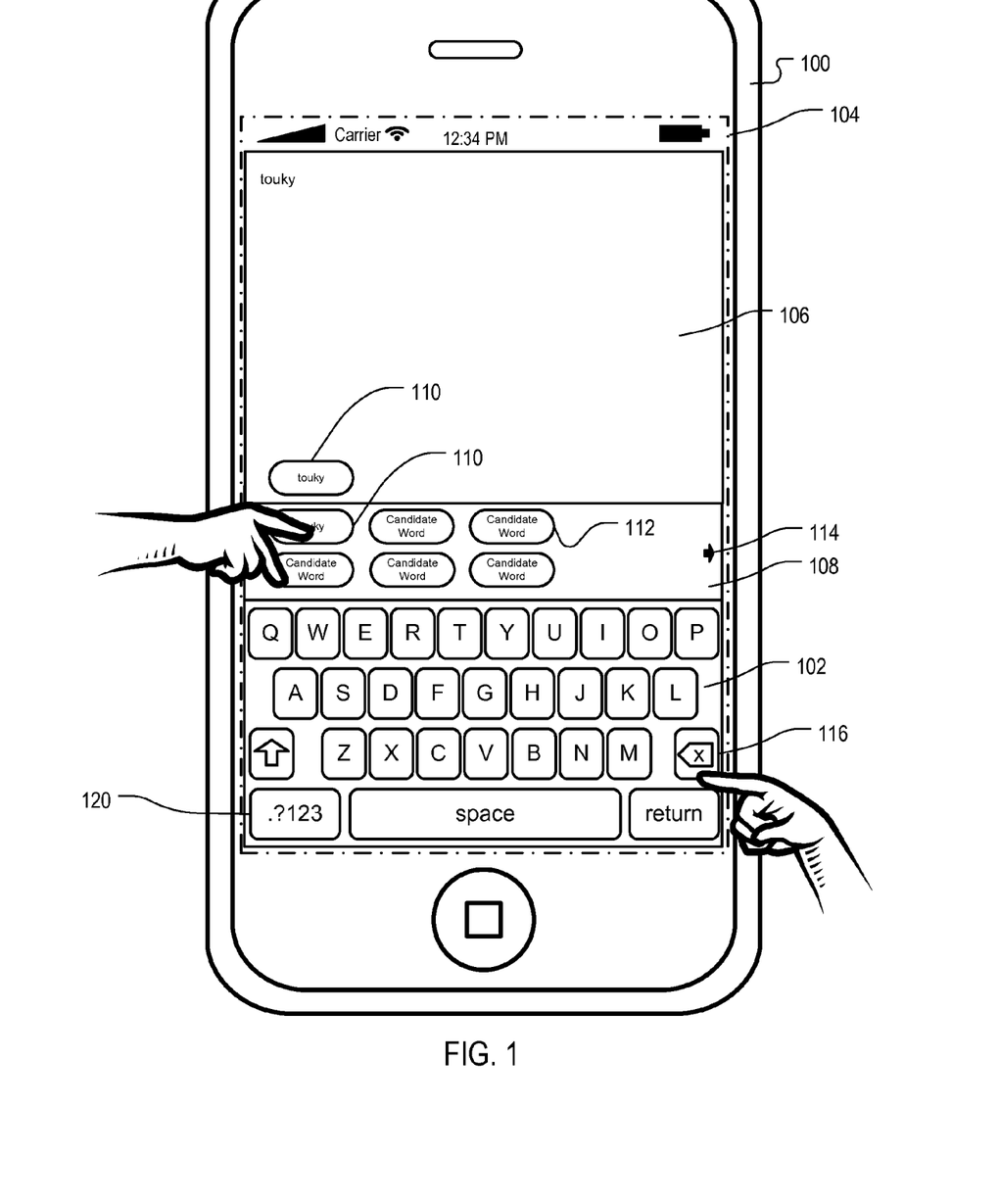
FIG. 1 shows an example portable device for receiving text input.

FIG. 1 shows an example portable device 100 for receiving text input. The portable device 100 can be phone, a media player, an email device, or any other portable device capable of receiving text input. The device 100 includes a virtual keyboard 102, an editing region 106, and an input region 108. Each of these regions can be part of touch-sensitive display 104. In some implementations, the touch-sensitive display 104 can be a multi-touch-sensitive display for receiving multi-touch input or finger gestures. A multi-touch-sensitive display 104 can, for example, process multiple simultaneous touch points, including processing data related to the pressure, degree, and/or position of each touch point. Such processing facilitates gestures and interactions with multiple fingers, chording, and other interactions. Some examples of multi-touch-sensitive display technology are described in U.S. Pat. Nos. 6,323,846, 6,570,557, 6,677,932, and U.S. Patent Publication No. 2002/0015024A1, each of which is incorporated by reference herein in its entirety.

The virtual keyboard 102 can be displayed in various layouts based on a user selection. For example, the user can select to display one of a number of virtual keyboard layouts using an action button 120 or other finger gesture. As shown, the virtual keyboard 102 is an English keyboard layout (e.g., QWERTY). The keyboard layout, however, can be configured based on a selected language, such as Japanese, French, German, Italian, etc. In a Japanese language environment, the user can switch between a kana keyboard, a keyboard for Roman characters, and a keyboard for kanji symbols.

A user can interact with the virtual keyboard 102 to enter text into a document (e.g., text document, instant message, email, address book) in the editing region 106. As the user enters characters, an input correction process is activated which can detect text input error and display candidate words 112 in the input region 108. Any number of candidate words 112 can be generated. A group of displayed candidate words 112 can include candidate words 112 having characters in two or more character types (e.g., Roman, kana, kanji). In some implementations, additional candidate words 112 can be displayed by clicking on arrows 114 or other user interface element, which causes a new page of candidate words 112 to be displayed in the input region 108. In some implementations, the candidate list can be determined based on the user-selected language and statistics (e.g., a user dictionary or a history of user typing data for the user-selected language). An example method of determining correction options for virtual keyboards is described in U.S. patent application Ser. No. 11/228,737, for "Activating Virtual Keys of a Touch-screen Virtual Keyboard," which patent application is incorporated by reference herein in its entirety.

In some implementations, a candidate word look-up takes place using an auto-correcting search. In performing the auto-correcting search, a list of candidate words can be produced based on the text input and accounting for possible typographical errors in the text input.

Candidate Word Lists

In the example shown, the user has selected a candidate word 110 to replace "touky" in a Japanese language environment. Selection of the candidate word 110 is made by the user touching the candidate word 110 with one or more fingers. When the user releases the touch, the selected candidate word 110 is inserted into the document in the editing region 106. In some implementations, when the user touches the candidate word 110, the candidate word 110 is displayed in a different position on the touch-sensitive display 104 (e.g., an offset position) to avoid the user's finger obscuring the candidate word 110. A user can scroll the candidate list by swiping a finger over the candidate words 112. As the finger traverses each candidate word 112, the candidate word is displayed at the different position. For example, the user can run their index finger over the candidate words 112 in the input region 108 until the user reaches the candidate word 110. When the user releases the touch, the candidate word 110 is inserted into the document being edited.

Figure 2:
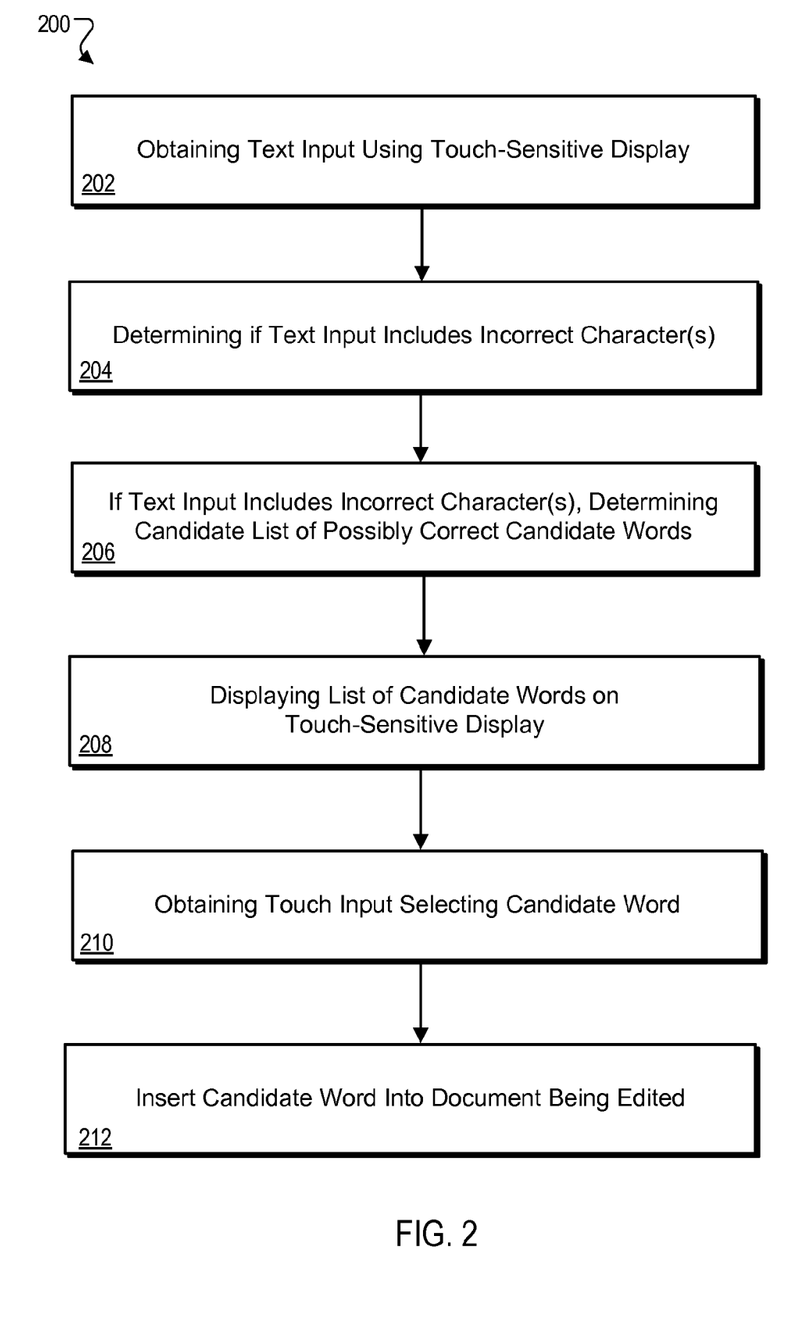
FIG. 2 is a flow diagram of an example process for correcting input in a multi-language environment.

FIG. 2 is a flow diagram of an example process 200 for correcting input in a multi-language environment. In some implementations, the process 200 begins when text input is obtained for a document being edited on a touch-sensitive display (202). The text input can be obtained as one or more touches or a finger gesture (e.g., on a virtual keyboard). Some or all of the text input can be, for example, in Roman characters or in Japanese characters (e.g., kana or kanji). The process 200 then determines if the text input includes one or more incorrect characters (204). For example, a language dictionary, statistics, and/or fuzzy logic can be used to determine incorrect text input.

If the text input includes an incorrect character or if the text input is ambiguous, then a candidate list of possibly correct candidate words is determined (206) and displayed on the touch-sensitive display (208) to the user. For example, in a Japanese language environment, if the text input is a phonetic spelling in Roman characters of a Japanese character, the candidate list can include candidate words having two or more character types (e.g., kanji and kana). Even if the text input does not include an incorrect character, there can be ambiguity in the conversion from the Roman characters to Japanese characters. To account for this ambiguity, the process 200 includes determining a candidate list of multiple possibly correct candidate words, allowing the user to select the intended Roman to Japanese conversion if it is in the candidate list. Any number of candidate words can be included in the candidate list. The list can be displayed in a dedicated region (e.g., an input region 108) of a touch-sensitive display, for example.

The user can scroll the candidate list with the user's finger. When the finger is over (or proximate to) a candidate word, the candidate word can be displayed in a different position of the touch-sensitive display, offset from the original location of the candidate word to avoid the user's finger from obscuring the selected candidate word. After touch input (e.g., one or more touches or a finger gesture) is obtained for the selected candidate word (210), the selected candidate word is inserted into the document being edited (212).

Erasing Characters

In the example shown, the user can erase characters in text input by touching a backspace or delete key 116, then sliding their finger from the key 116 towards the opposite end of the virtual keyboard 102. As the user slides their finger, a number of characters proportional to the distance traversed by the finger across the touch-sensitive display 104 are erased. If there are characters in the input region 108 (e.g., characters currently being added to a document), those characters can be erased first. When the characters in the input region 108 are exhausted, characters in the editing region 106 can be erased (e.g., characters in a word previously entered in the document).

Figure 3:
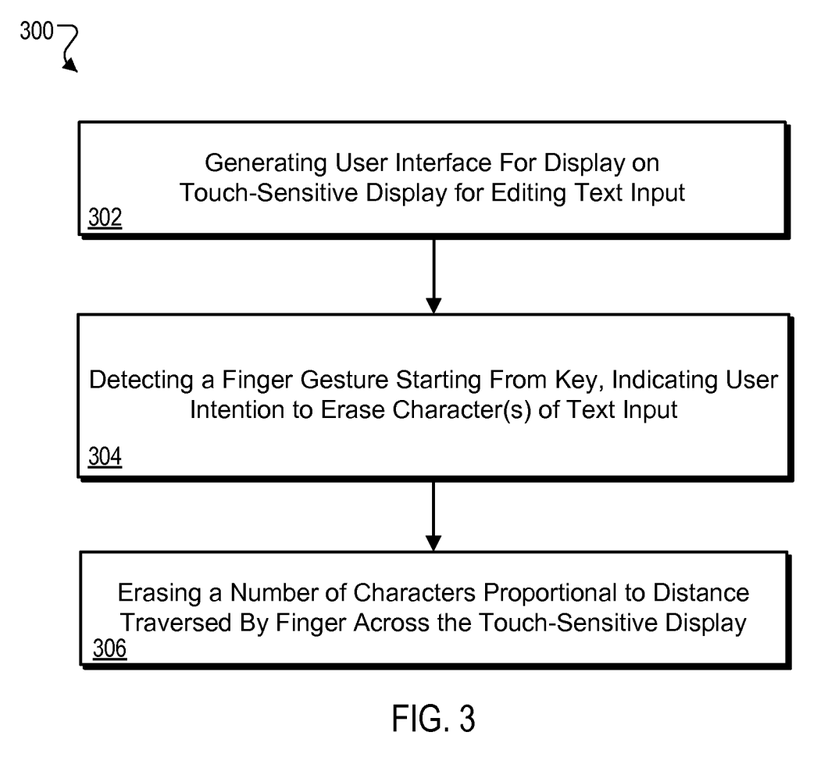
FIG. 3 is a flow diagram of an example process for erasing characters in a multi-language environment.

FIG. 3 is a flow diagram of an example process 300 for erasing characters in a multi-language environment. In some implementations, the process 300 begins by generating a user interface on a touch-sensitive display for editing text input (302). The user interface can include a virtual keyboard, an editing region, and a text input region. A finger touch and gesture is detected starting from a key on the virtual keyboard (e.g., a backspace key, a delete key), indicating the intention of a user to erase one or more characters of text input displayed in the input region (304). In some implementations, the gesture can be a finger sliding or swiping from the touched key across the touch-sensitive display. The sliding or swiping can be in any desired direction on the touch-sensitive display. A distance for which the swipe or gesture will result in the erasure of characters (e.g., linear distance traversed by the finger across the display) can be bounded by the visual borders of the virtual keyboard displayed on the touch-sensitive display or any other desired boundaries. The number of characters erased due to the gesture can be proportional to the linear distance traversed by the finger across the touch-sensitive display (306). In some implementations, the characters displayed in the input region are erased first, followed by characters in the editing region, as described in reference to FIG. 1.

Example System Architecture

Figure 4:
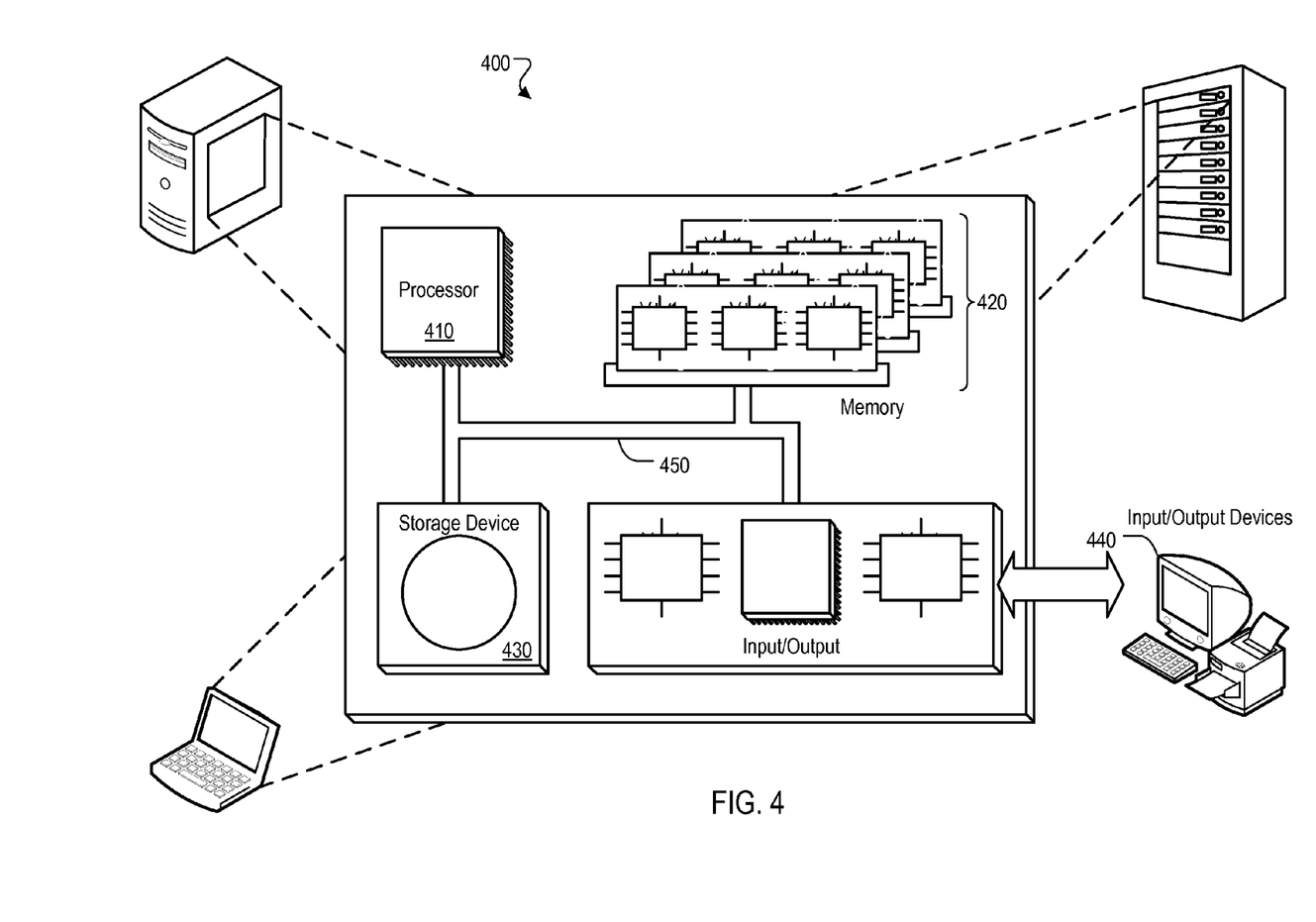
FIG. 4 is a block diagram of an example system architecture for performing the operations described in reference to FIGS. 1-3.

FIG. 4 is a block diagram of an example system architecture 400 for performing the various operations described in reference to FIGS. 1-3. For example, the architecture 400 may be included in the portable device 100, described in reference to FIG. 1. The architecture 400 includes a processor 410, a memory 420, a storage device 430, and an input/output device 440. Each of the components 410, 420, 430, and 440 are interconnected using a system bus 450. The processor 410 is capable of processing instructions for execution within the architecture 400. In some implementations, the processor 410 is a single-threaded processor. In other implementations, the processor 410 is a multi-threaded processor. The processor 410 is capable of processing instructions stored in the memory 420 or on the storage device 430 to display graphical information for a user interface on the input/output device 440.

The memory 420 stores information within the architecture 400. In some implementations, the memory 420 is a computer-readable medium. In other implementations, the memory 420 is a volatile memory unit. In yet other implementations, the memory 420 is a non-volatile memory unit.

The storage device 430 is capable of providing mass storage for the architecture 400. In some implementations, the storage device 430 is a computer-readable medium. In various different implementations, the storage device 430 may be a floppy disk device, a hard disk device, an optical disk device, or a tape device.

The input/output device 440 provides input/output operations for the architecture 400. In some implementations, the input/output device 440 includes a keyboard and/or pointing device. In other implementations, the input/output device 440 includes a display unit for displaying graphical user interfaces.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, a wireless network, and the computers and networks forming the Internet.

The computer system can include clients and servers. A client and server are generally remote from each other and typically interact through a network, such as those described above with respect to FIG. 1. The relationship of client and server arises by virtue of computer programs running on the respective computers and having a client-server relationship to each other.

Other Implementations

In a Japanese language environment, use of user interface elements, (e.g., popup menus or head-up displays) tied to virtual keyboard keys can be used to select unambiguous characters. There can be one key for every consonant and one for the vowels. In one implementation, if a user touches and slides on a key of a virtual keyboard, a popup menu is opened that lets the user select a syllable with that consonant (or none), and the appropriate vowel. Dragging on the "k" (ka) key lets the user select ka, ki, ku, ke, or ko. Dragging on the vowel key lets the user select a, i, u, e, or o, and so forth.

While the user slides horizontally to select a vowel, changing the direction of the drag to vertical lets the user select variants. For example, if the user starts on the "k" (ka) key and slides right, the user sees options for ka, ki, ku, ke, and ko. If the user slides down, the options change to ga, gi, gu, ge, and go, and the user can slide horizontally again to select one of these syllables starting with the "g" consonant. The user can also slide up, giving up to x (e.g., 3 rows) of options for each popup menu (e.g., unshifted, shift down, shift up).

If the user taps a key, the user gets a wildcard (ambiguous) character that can match anything the user could produce using that key. Tapping the "k" (ka) key gives the user something that matches ka; those syllables in that position are considered. The wildcard character can be converted to an unambiguous syllable or character by sliding on it, in exactly the same way as the user can slide on a key.

Figure 5:
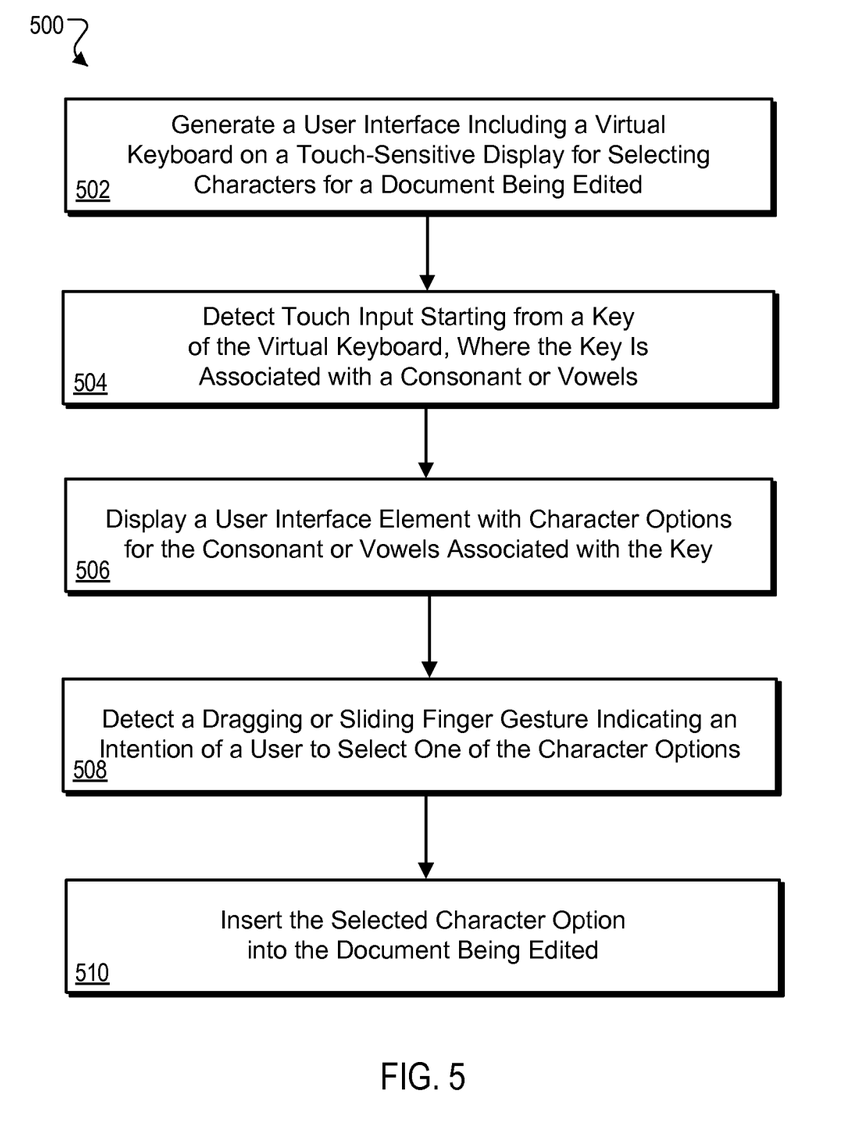
FIG. 5 is a flow diagram of an example process for displaying selectable character options for a document being edited.

FIG. 5 is a flow diagram of an example process 500 for displaying selectable character options for a document being edited. In some implementations, the process 500 begins by generating a user interface on a touch-sensitive display for selecting characters for a document being edited on the touch-sensitive display (502). The user interface can include a virtual keyboard. A touch input is detected starting from a key of the virtual keyboard, where the key is associated with a consonant or vowels (504). In some implementations, the touch input can be a finger sliding or swiping from the touched key across the touch-sensitive display. A user interface element is displayed on the touch-sensitive display, where the user interface element (e.g., a popup menu) includes multiple character options for the consonant or vowels associated with the key (506). Each character option is selectable by a user. In some implementations, at least some of the character options are in Japanese. In some implementations, a dragging or sliding finger gesture is detected (508). The finger gesture can indicate an intention of a user to select one of the character options. Upon detection of the finger gesture, the selected character option can be inserted into the document being edited (510).

A number of implementations have been described. Nevertheless, it will be understood that various modifications may be made. For example, elements of one or more implementations may be combined, deleted, modified, or supplemented to form further implementations. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method, comprising:
at a device with a touch-sensitive display:
generating a user interface on the touch-sensitive display for editing text input, the user interface including an editing region and an input region, and a virtual keyboard that is located outside of the editing region and the input region, the virtual keyboard having keys for entering characters in the editing region or input region;
detecting a user gesture inside a region of the virtual keyboard, the user gesture starting from a key on the virtual keyboard, wherein the user gesture is operable to cause erasure of one or more characters of text input displayed in the input region or the editing region; and
erasing a number of characters proportional to a distance traversed by the user gesture across the touch-sensitive display.

2. The method of claim 1, wherein the characters displayed in the input region are erased first, followed by characters in the editing region.

3. The method of claim 1, wherein the number of characters erased is proportional to the distance traversed by the user gesture bounded by a visual border of the virtual keyboard.

4. A computer-readable medium having instructions stored thereon, which, when executed by a processor, causes the processor to perform operations comprising:
generating a user interface on a touch-sensitive display for editing text input, the user interface including an editing region and an input region, and a virtual keyboard that is located outside of the editing region and the input region, the virtual keyboard having keys for entering characters in the editing region or input region;
detecting a user gesture inside a region of the virtual keyboard, the user gesture starting from a key on the virtual keyboard, wherein the user gesture is operable to cause erasure of one or more characters of text input displayed in the input region or the editing region; and
erasing a number of characters proportional to a distance traversed by the user gesture across the touch-sensitive display.

5. The computer-readable medium of claim 4, wherein the characters displayed in the input region are erased first, followed by characters in the editing region.

6. The computer-readable medium of claim 4, wherein the number of characters erased is proportional to the distance traversed by the user gesture bounded by a visual border of the virtual keyboard.

7. A device, comprising:
a touch-sensitive display;
a processor; and
memory coupled to the processor and storing instructions, which, when executed by the processor, cause the processor to perform operations comprising:
generating a user interface on the touch-sensitive display for editing text input, the user interface including an editing region and an input region, and a virtual keyboard that is located outside of the editing region and the input region, the virtual keyboard having keys for entering characters in the editing region or input region;
detecting a user gesture inside a region of the virtual keyboard, the user gesture starting from a key on the virtual keyboard, wherein the user gesture is operable to cause erasure of one or more characters of text input displayed in the input region or the editing region; and
erasing a number of characters proportional to a distance traversed by the user gesture across the touch-sensitive display.

8. The device of claim 7, wherein the characters displayed in the input region are erased first, followed by characters in the editing region.

9. The device of claim 7, wherein the number of characters erased is proportional to the distance traversed by the user gesture bounded by a visual border of the virtual keyboard.

* * * * *

UNITED STATES PATENT AND TRADEMARK OFFICE
CERTIFICATE OF CORRECTION

| | |
|---|---|
| PATENT NO. | : 9,465,536 B2 |
| APPLICATION NO. | : 14/187176 |
| DATED | : October 11, 2016 |
| INVENTOR(S) | : Deborah Eileen Goldsmith et al. |

It is certified that error appears in the above-identified patent and that said Letters Patent is hereby corrected as shown below:

On the Title Page

Under Inventors, after Deborah Eileen Goldsmith, delete "Los Gato" and add --Los Gatos--.

Under Related U.S. Application Data, after Continuation of application No., delete "12/307,429" and add --12/207,429--.

Signed and Sealed this
Twenty-fifth Day of April, 2017

Michelle K. Lee
*Director of the United States Patent and Trademark Office*